United States Patent
Palomba et al.

(10) Patent No.: US 9,945,388 B2
(45) Date of Patent: Apr. 17, 2018

(54) METHOD FOR MAKING AN IMPELLER FROM SECTOR SEGMENTS

(71) Applicant: Nuovo Pignone Srl, Florence (IT)

(72) Inventors: Sergio Palomba, Tuscany (IT);
Lorenzo Lorenzi, Florence (IT);
Lorenzo Bianchi, Florence (IT)

(73) Assignee: Nuovo Pignone Srl, Florence (IT)

(*) Notice: Subject to any disclaimer, the term of this patent is extended or adjusted under 35 U.S.C. 154(b) by 244 days.

(21) Appl. No.: 14/769,393

(22) PCT Filed: Feb. 19, 2014

(86) PCT No.: PCT/EP2014/053246
§ 371 (c)(1),
(2) Date: Aug. 20, 2015

(87) PCT Pub. No.: WO2014/128169
PCT Pub. Date: Aug. 28, 2014

(65) Prior Publication Data
US 2016/0003257 A1 Jan. 7, 2016

(30) Foreign Application Priority Data
Feb. 20, 2013 (IT) .............................. CO2013A0004

(51) Int. Cl.
*F04D 17/10* (2006.01)
*F04D 29/28* (2006.01)
(Continued)

(52) U.S. Cl.
CPC ............ *F04D 29/284* (2013.01); *B23K 20/12* (2013.01); *B23P 15/006* (2013.01); *F04D 17/10* (2013.01);
(Continued)

(58) Field of Classification Search
CPC ...... F04D 17/10; F04D 29/284; F04D 29/624; F01D 5/34; B23K 20/12; B23K 2201/001; B23P 15/006
See application file for complete search history.

(56) References Cited

U.S. PATENT DOCUMENTS

| | | | |
|---|---|---|---|
| 2,781,989 A | | 2/1957 | Hagood et al. |
| 4,428,717 A | * | 1/1984 | Catterfeld ................. F04D 7/04 |
| | | | 29/889.4 |

(Continued)

FOREIGN PATENT DOCUMENTS

| | | |
|---|---|---|
| CN | 1412418 A | 4/2003 |
| CN | 1816475 A | 8/2006 |

(Continued)

OTHER PUBLICATIONS

Unofficial English Translation of Chinese Office Action issued in connection with corresponding CN Application No. 201480009642.6 dated Oct. 31, 2016.

(Continued)

*Primary Examiner* — Igor Kershteyn
(74) *Attorney, Agent, or Firm* — GE Global Patent Operation (57) ABSTRACT

A manufacturing technique for impellers for a centrifugal rotating machine is provided. The impeller is made by composition of single vanes pieces that fit to the hub or directly to the rotor shaft by welding, friction welding or a mechanical locking system. The manufacturability of the segments is easy fast and cheap and make it possible to use advanced manufacturing technologies like additive manufacturing of the type of Direct Metal Laser Melting.

16 Claims, 6 Drawing Sheets

(51) Int. Cl.
*F04D 29/62* (2006.01)
*B23K 20/12* (2006.01)
*B23P 15/00* (2006.01)
*F01D 5/34* (2006.01)
*B23K 101/00* (2006.01)

(52) U.S. Cl.
CPC ...... *F04D 29/624* (2013.01); *B23K 2201/001* (2013.01); *F01D 5/34* (2013.01)

(56) References Cited

U.S. PATENT DOCUMENTS

| | | | |
|---|---|---|---|
| 5,113,583 A * | 5/1992 | Jenkel | B21K 3/04 228/193 |
| 6,217,282 B1 | 4/2001 | Stanka | |
| 8,066,476 B2 * | 11/2011 | Orban | F04D 13/10 415/196 |
| 8,684,069 B2 | 4/2014 | Mottin et al. | |
| 9,033,670 B2 * | 5/2015 | Mittendorf | F01D 5/04 29/889.21 |
| 9,611,742 B2 | 4/2017 | Nakaniwa et al. | |
| 2003/0077176 A1 | 4/2003 | Yehle et al. | |
| 2004/0120819 A1 | 6/2004 | Gazzillo et al. | |
| 2004/0219021 A1 | 11/2004 | Shaw | |
| 2006/0034695 A1 | 2/2006 | Hall et al. | |
| 2011/0318183 A1 | 12/2011 | Noronha et al. | |

FOREIGN PATENT DOCUMENTS

| | | |
|---|---|---|
| CN | 101438029 A | 5/2009 |
| CS | 271140 B1 | 8/1990 |
| EP | 0899426 A2 | 3/1999 |
| EP | 2402112 A2 | 1/2012 |
| GB | 2061399 A | 5/1981 |
| JP | S5666486 A | 6/1981 |
| JP | 2005291116 A | 10/2005 |
| JP | 2012172645 A | 9/2012 |
| KR | 20120075187 A | 7/2012 |
| WO | 2007133204 A1 | 11/2007 |
| WO | 2012001324 A1 | 1/2012 |
| WO | 2012041651 A1 | 4/2012 |

OTHER PUBLICATIONS

Italian Search Report issued in connection with corresponding Application No. CO20130004 dated Nov. 14, 2013.

PCT Search Report and Written Opinion issued in connection with corresponding PCT Application No. PCT/EP2014/053246 dated May 9, 2014.

Machine translation and Office Action issued in connection with corresponding CN Application No. 201480009642.6 dated Jun. 16, 2017.

Japanese Office Action issued in connection with corresponding JP Application No. 2015557476 dated Dec. 19, 2017.

* cited by examiner

METHOD FOR MAKING AN IMPELLER FROM SECTOR SEGMENTS

FIELD OF INVENTION

Embodiments of the present invention relate to a method of manufacture of an impeller for a centrifugal compressor.

BACKGROUND ART

An impeller for a centrifugal rotating machine, such as a centrifugal compressor, is generally composed of an approximately disk shaped main body having a front and a rear surfaces, with respect to the direction of the fluid flow, provided with a central circular hole that fits with a hub attached to a rotating axis, a shroud having a front and a rear surfaces that is arranged at an interval outward of the main body and a series of blades that couple the front surface of the main body and the rear surface of the shroud. A series of passages are formed by the front surface of the main body, the rear surface of the shroud and the side surfaces of the blades, the passages serving as a flow passage for compressing air. Generally the blades follow a curved line bending in both radial and axial direction. The front surface of the main body and the rear surface of the shroud bend accordingly to accommodate the curvature of the blades. The air flow enters the impeller tangentially to the front surface of the main body and exits from the impeller in an axial direction. A shrouded impeller may be manufactured from one single solid piece of material or it may instead be constructed from two or more components, which are attached together to form the finished product. In general the various components are fixed by welding. The impeller can be constructed from one single solid piece by full milling, but this process is very difficult and time consuming due to the limited accessibility given the complex shape of the flow passages. Electrical Discharge Machining (EDM) process is also an option for the single piece fabrication by means of electric spark metal-removal erosion. In this process an electric spark is used as the cutting tool to erode the single monolithic disc to produce the finished part to the design shape. The metal-removal process is performed by applying a pulsating (ON/OFF) electrical charge of high-frequency current through the electrode to the work piece. This technique involves the step of machining the single piece by premilling followed by EDM roughing and EDM finishing. For the reason set before, special shaped electrodes and special shaped tools must be used to conform to the complex passages design. The process is very time consuming and many working days are necessary to produce a single impeller. The impeller can be produced also by fabricating first two components i.e. by obtaining the blades by means of milling the main body or the shroud and subsequently by welding the two parts. With welding filling the internal junction between blades and main body or shroud given the lack of good accessibility is very difficult and welding defects easily occur in the fixing and thus the risk of cracking and deformation, i.e. thermal distortion, due to locally high temperatures, can become very high. Besides the surfaces of the flow passage will not have in general the smoothness required. In definitive it is very hard by using state of the art techniques to obtain an impeller with the high quality and reliability required. For these reasons a method to make an impeller having higher quality and that results in shorter production time and lower costs is highly needed.

SUMMARY OF THE INVENTION

An embodiment of the present invention provides a new method of manufacture of an impeller that is simple and requires shorter machining times. Another embodiment provides a method of manufacturing an impeller having high qualities and reliability.

A further objective of an embodiment of the present invention is to provide an impeller for centrifugal compressor that enables advanced manufacturing technique.

Yet another scope of an embodiment of the present invention is a method that allows the making of an impeller having complex geometries.

The present invention, therefore, achieves the objectives discussed above by means of a method of manufacture of an impeller for a centrifugal rotating machine that, according to claim 1, is composed by an almost disk shaped main body having a front and rear surface, a shroud having a front and a rear surfaces arranged spaced from the front surface of the main body, a plurality of blades, attached to the front surface of the main body joining the main body with the shroud, the side surfaces of the blades, the front surface of the body and the rear surface of the shroud forming flow passages for compressing air, wherein the method comprises making single segments of impeller consisting of a single blade, a section of the body and the corresponding section of the shroud, and then joining together the plurality of segments to form the impeller.

Another aspect of the invention provides for an impeller for a centrifugal rotating machine, the impeller comprising a substantially disk shaped main body comprising a front surface and a rear surface; a shroud having a front and a rear surfaces arranged spaced from the front surface of the main body; and a plurality of blades attached to the front surface of the main body joining the main body with the shroud. The side surfaces of the blades, the front surface of the body and the rear surface of the shroud forming flow passages for compressing air; wherein the impellar is composed by single segments comprising of a single blade, a section of the main body and the corresponding section of the shroud, the single segments being joined together or fixed to the bub or directly to the rotor shaft.

In an embodiment, the single segments can be produced using methods of additive manufacturing like Direct Metal Laser Melting (DMLM). In an embodiment the single segments are joined together by welding or friction welding. The single sectors can also not be joined to each other, but be attached to the hub or directly to the shaft by means of mechanical junctions or welding. In another embodiment, the single sectors, or the entire impeller can be attached to the hub by mechanical joints like dovetail joints.

BRIEF DESCRIPTION OF THE DRAWINGS

Further characteristics and advantages of the invention will become more apparent in light of a detailed description of embodiments of an impeller for rotating machines, illustrated by way of non-limitative examples, with the aid of the accompanying drawings where.

The same reference numbers in the figures identify the same elements or components.

DETAILED DESCRIPTION

Figure 1:
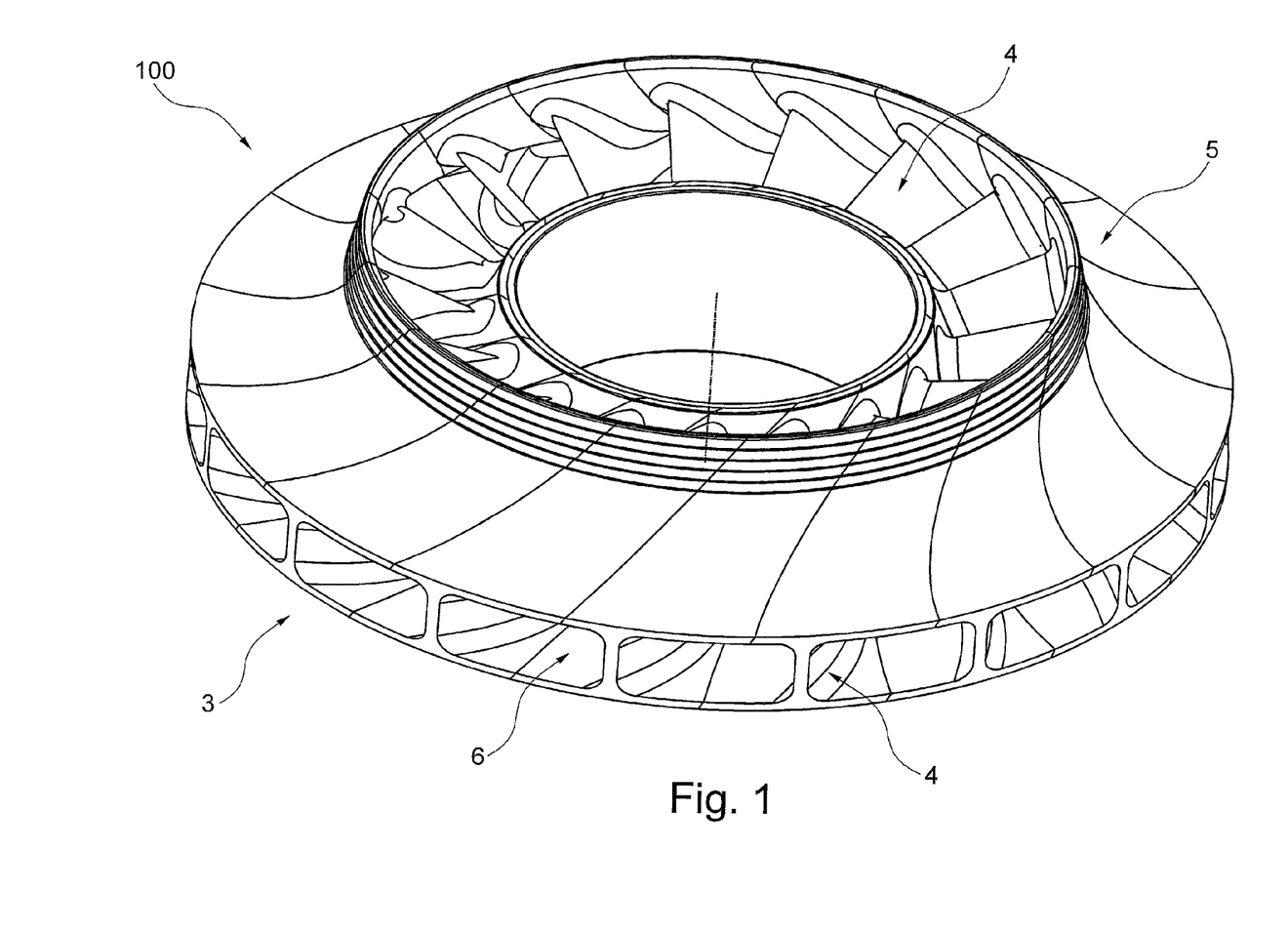
FIG. 1 is a perspective view of an impeller according to an embodiment of the invention.
Figure 2:
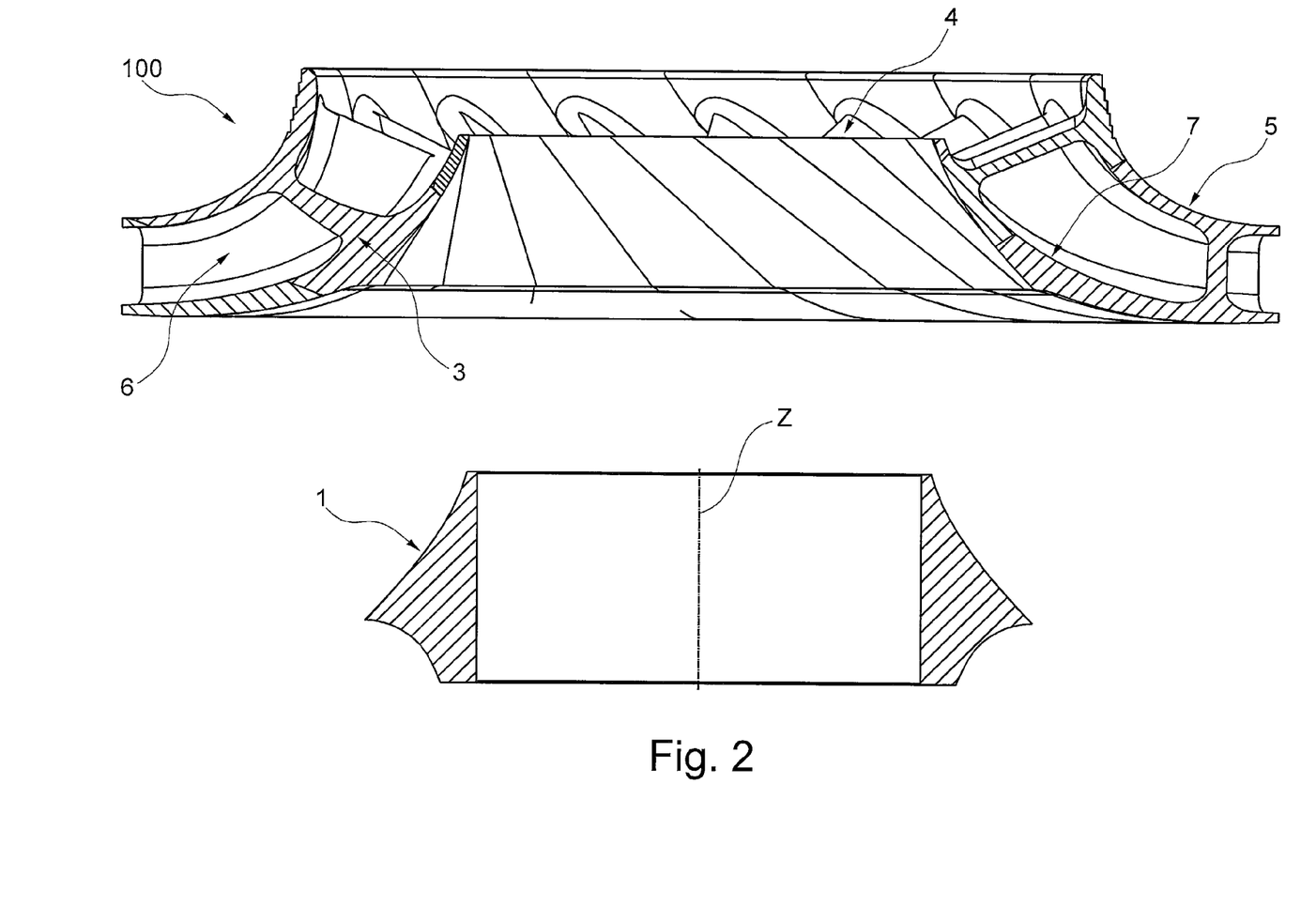
FIG. 2 is an exposed view of a cross section of an impeller before being fixed to the hub according to an embodiment of the invention.
Figure 3:
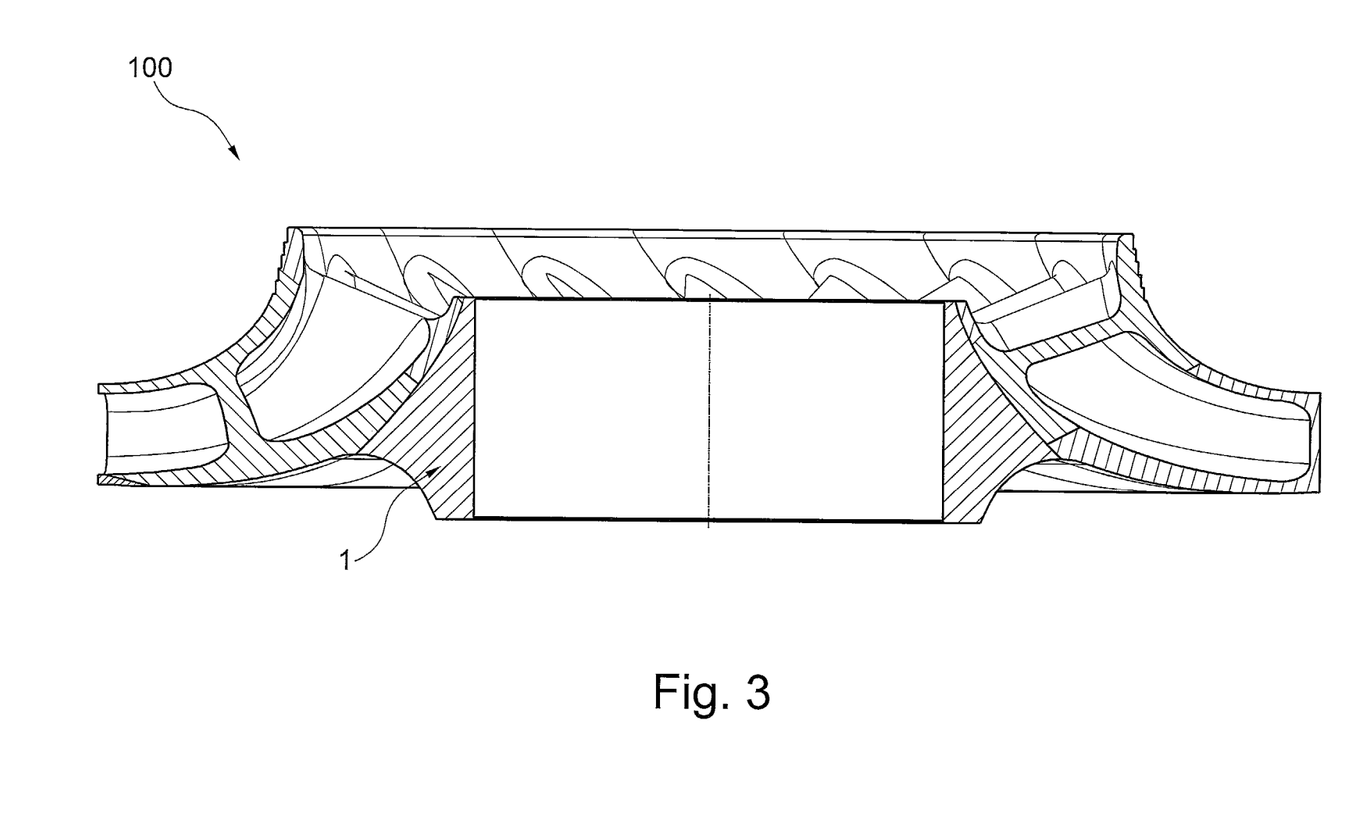
FIG. 3 represents a transverse section of the impeller joined to the hub according to an embodiment of the invention.
Figure 4:
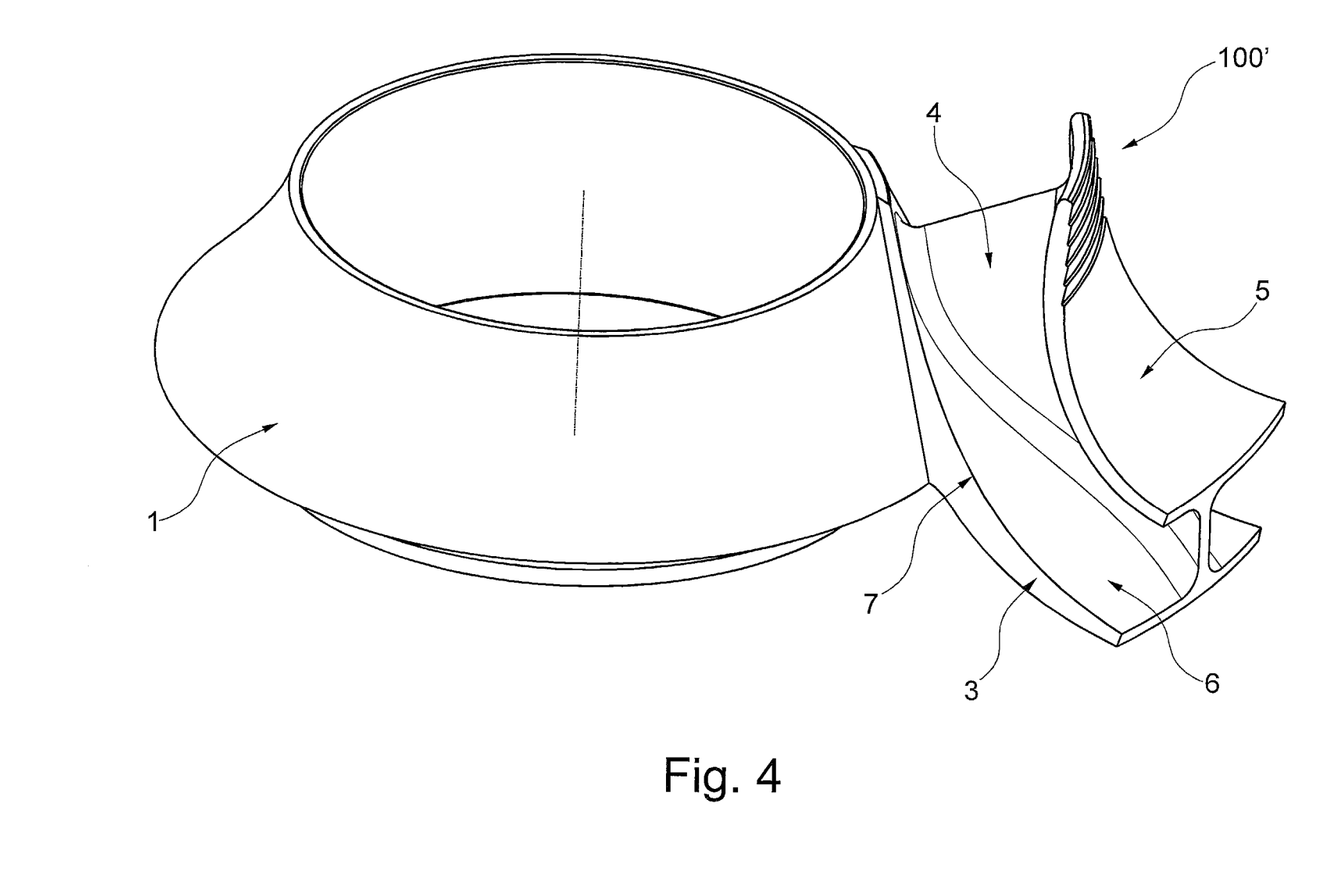
FIG. 4 represents a single segment of the impeller mounted on the hub according to an embodiment of the invention.

With reference to FIGS. 1 and 2 there is shown a perspective representation of a 3D impeller generally indicated with reference numeral 100. The impeller 100 is formed by a disk shaped main body 3 having a rear surface and a front surface 7. The front surface 7 starting from an outer circular portion almost flat and perpendicular to the rotating axis Z of the machine gradually curves towards the central region in the direction of the axis Z, the central region being a circular aperture adapted to mate with the external surface of the hub 1 or of the rotor shaft. A shroud 5 roughly following the shape of the front surface 7 of the body 3 is separated from this front surface by the blades 4. Air passages 6 through which the air is compressed are formed by the internal surface of the shroud, the front surface 7 of the body 3 and the lateral surfaces of the blades 4. In this type of impeller for a centrifugal compressor, the air flow enters the passages tangentially to the flat surface of the body towards the rotational axis and exits in an almost vertical direction parallel to said rotational axis from the circular passage formed between the front surface 7 of the body and the internal surface of the shroud. In FIG. 2 there is shown a sectional exploded view of this type of impeller with the hub 1 shown as a separated element to be inserted in the central region of the body 3. The hub 1 is attached to the rotor shaft of the machine. FIG. 3 shows the final assembly of the impeller with the insertion of the hub 1. The blades 4 and thus the air passages 6 have generally a complex shape. As seen from FIGS. 1 and 2 they follow a curved path not only in the axial direction but they are also backswept relative to the direction of rotation of the impeller. These characteristics of the impeller make very complex and laborious the work of milling and welding even when using special tools suitable to be inserted to operate in those air passages 6. These difficulties are detrimental to good accuracy, surface roughening and time. The present invention is based on the principle of segmentation in order to overcome these drawbacks. FIG. 4 is a representation of such technique. The idea consists essentially in making single segments of impeller, each segment for example containing a single blade, and then composing them to assemble the impeller by welding or by a mechanical locking system. The segments can be joined to each other or can be fixed to the shaft separately. In FIG. 4 reference 100' indicates one of these segments to be welded to the hub 1. The segment is composed by a segment of shroud 5 and a segment of the main body 3 joined by a blade 4. In FIG. 4 it is also possible to see the complex shape of the blades and of the passages. By segmentation the problem of accessibility would be completely resolved. The impeller can be made by joining together the single segments 100' by external laser welding, and then joining the welded segments to the hub or directly to the rotor shaft by Cold Metal Transfer (CMT) deposition. It follows a step of heating and turning to arrive to the finished product.

Figure 5:
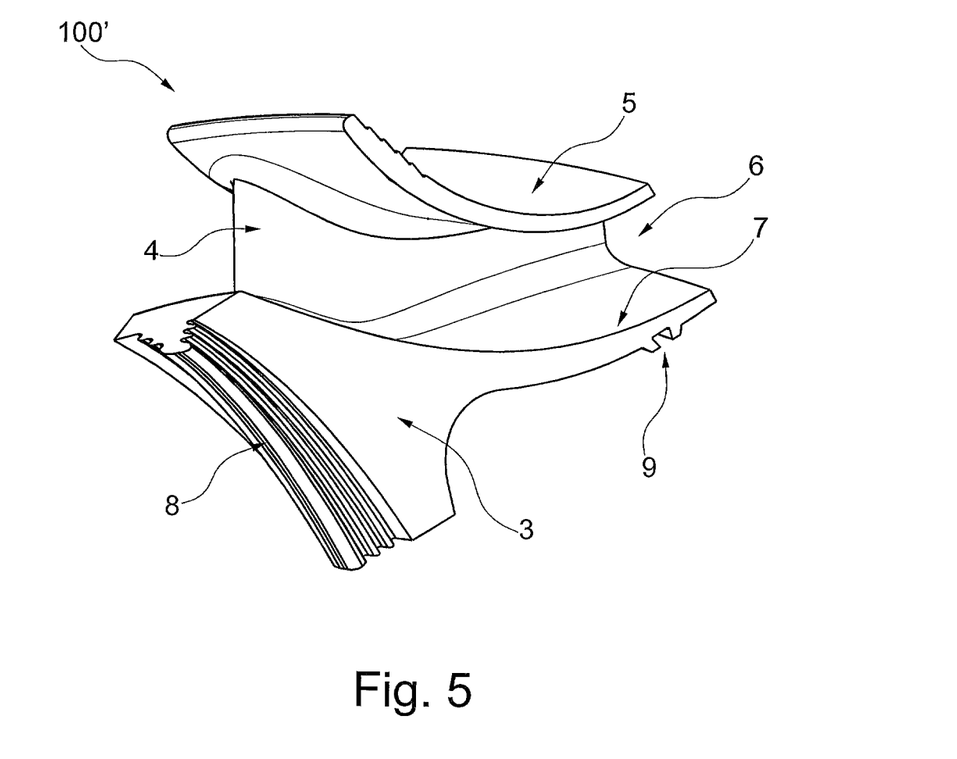
FIG. 5 is a perspective view of a segment of an impeller according to another embodiment of the invention.
Figure 6:
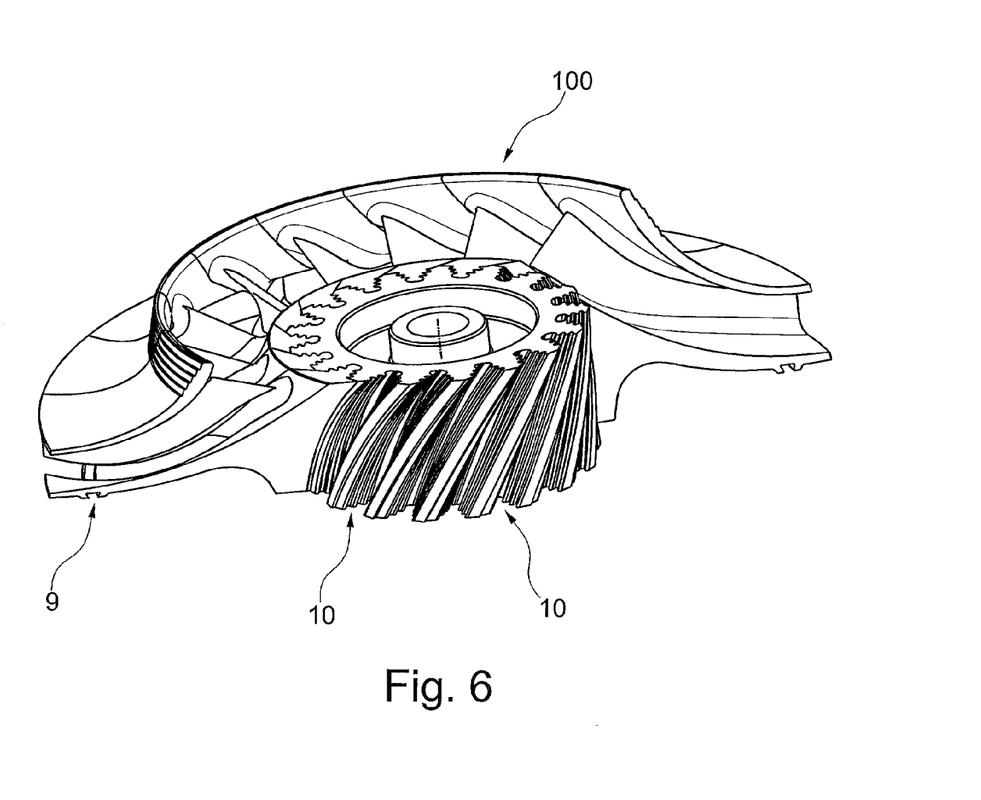
FIG. 6 is a perspective view of an impeller containing the segments shown in FIG. 5.

It is also possible to fix the single segments one by one to the hub as shown in FIG. 4 or directly on the rotor shaft. The segment 100' can be attached to the hub, or directly to the rotor shaft, also by means of a mechanical locking system as shown in FIG. 5 and FIG. 6. In FIG. 5 there is shown a segment having on the side facing the external surface of the hub a dovetail key 8 with inclined side walls. These dovetail keys 8 slidingly engage into it a corresponding mating dovetail groove 10, shown in FIG. 6, formed on the external surface of the hub. FIG. 6 shows a perspective sectional view of an impeller made by using this mechanical locking system. The impeller can be assembled on the hub as a single piece with the segments joined together by welding and then sliding the hub into the central part or by sliding the segments one by one into the dovetail grooves of the hub. When using the mechanical locking system the single segment can be provided with a groove 9 on the rear flat side surface of the body 3, FIG. 5, FIG. 6, that when the impeller is assembled forms a circular groove that can be provided with a ring to fasten the segments together. The manufacturing of a single blade segment is not only easy, fast and cheap, but also enables the use of advanced manufacturing technologies e.g. the use of composite material or techniques like Direct Metal Laser Melting (DMLM), where a laser fuses metal powder into a solid, three-dimensional part in an additive, layer by-layer process. Compared with the many days necessary to make an impeller by means of state of the art technology, for example by Electrical Discharge Machining (EDM), that requires a phase of Premilling followed by EDM roughing and finishing, the assembling of prefabricated single blade segments takes only few hours with a considerable savings of time and costs, without considering the improvement in quality. Making the impeller by assembling single blade segments, given the simplicity of fabrication and the high versatility of the process, enables also the design and fabrication of advanced high performance flow path of innovative geometries, that at the moment are not yet feasible.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for manufacturing an impeller for a centrifugal rotating machine comprising a substantially disk shaped main body comprising a front surface and a rear surfaces, a shroud comprising a front surface and a rear surfaces arranged spaced from the front surface of the main body, a plurality of blades attached to the front surface of the main body joining the main body with the shroud wherein side surfaces of the blades, the front surface of the body, and the rear surface of the shroud form flow passages configured to compress air, the method comprising:

making a single segments of the impeller comprising a single blade, a section of the main body and the corresponding section of the shroud; and joining together the plurality of segments to form the impeller, attaching the segments to a hub or to a rotor shaft by at least one of welding, friction welding, or by a mechanical locking system, wherein the mechanical locking system comprises dovetail joints.

2. The method according to claim 1, further comprising joining together the segments by welding, or friction welding.

3. The method according to claim 1, further comprising attaching the impeller to a hub that is attached to a rotor shaft of the machine, or attaching directly to the rotor shaft.

4. The method according to claim 3, further comprising attaching the impeller to the hub or directly to the rotor shaft by Cold Metal Transfer (CMT) deposition.

5. The method according to claim 1, further comprising attaching the single segments to the hub or directly to the rotor shaft of the machine.

6. The method according to claim 1, further comprising fixing the impeller to the hub or to the rotor shaft by dovetail joints.

7. The method according to claim 1, further comprising fastening the segments together by a ring positioned in a groove formed on the rear surface of the main body.

8. The method according to claim 1, further comprising producing the single segments by direct metal laser melting.

9. The method according to claim 2, further comprising attaching the impeller to a hub that is attached to a rotor shaft of the machine, or attaching directly to the rotor shaft.

10. An impeller for a centrifugal rotating machine the impeller, the impeller comprising:
a substantially disk shaped main body comprising a front surface and a rear surfaces;
a shroud having a front and a rear surfaces arranged spaced from the front surface of the main body; and
a plurality of blades attached to the front surface of the main body joining the main body with the shroud, the side surfaces of the blades, the front surface of the body and the rear surface of the shroud forming flow passages configured to compress air,
wherein the impeller is composed by single segments comprising a single blade, a section of the main body and the corresponding section of the shroud, the single segments being joined together or fixed to the hub or directly to the rotor shaft by at least one of welding, friction welding, or by a mechanical locking system, and
wherein the mechanical locking system comprises dovetail joints.

11. An impeller according to claim 10, wherein the single segments have a dovetail key with inclined side surfaces on the side facing the external surface of the hub.

12. An impeller according to claim 11, wherein the hub presents on its external surface dovetail grooves with inclined surfaces in mating relationship with the dovetail keys of the segments.

13. An impeller according to claim 10, wherein the hub presents on its external surface dovetail grooves with inclined surfaces in mating relationship with the dovetail keys of the segments.

14. A centrifugal compressor comprising:
an impeller comprising:
a substantially disk shaped main body comprising a front surface and a rear surfaces;
a shroud having a front and a rear surfaces arranged spaced from the front surface of the main body; and
a plurality of blades attached to the front surface of the main body joining the main body with the shroud, the side surfaces of the blades, the front surface of the body and the rear surface of the shroud forming flow passages configured to compress air,
wherein the impeller is composed by single segments comprising a single blade, a section of the main body and the corresponding section of the shroud, the single segments being joined together or fixed to the hub or directly to the rotor shaft by at least one of welding, friction welding, or by a mechanical locking system, and
wherein the mechanical locking system comprises dovetail joints.

15. A centrifugal compressor according to claim 14, wherein the single segments have a dovetail key with inclined side surfaces on the side facing the external surface of the hub.

16. A centrifugal compressor according to claim 14, wherein the hub present on its external surface dovetail grooves with inclined surfaces in mating relationship with the dovetail keys of the segments.

* * * * *